(12) United States Patent
Mossakowski

(10) Patent No.: US 7,444,023 B2
(45) Date of Patent: Oct. 28, 2008

(54) METHOD FOR CODING AND DECODING DIGITAL DATA STORED OR TRANSMITTED ACCORDING TO THE PIXELS METHOD FOR TRANSMITTING PRIORITISED PIXELS

(75) Inventor: Gerd Mossakowski, Ahlen (DE)

(73) Assignee: T-Mobile Deutschland GmbH, Bonn (DE)

(*) Notice: Subject to any disclaimer, the term of this patent is extended or adjusted under 35 U.S.C. 154(b) by 411 days.

(21) Appl. No.: 10/520,382

(22) PCT Filed: Jul. 2, 2003

(86) PCT No.: PCT/DE03/02205

§ 371 (c)(1),
(2), (4) Date: Aug. 1, 2005

(87) PCT Pub. No.: WO2004/006582

PCT Pub. Date: Jan. 15, 2004

(65) Prior Publication Data

US 2006/0039579 A1    Feb. 23, 2006

(30) Foreign Application Priority Data

Jul. 3, 2002  (DE)  ................. 102 29 976

(51) Int. Cl.
| | |
|---|---|
| G06K 9/36 | (2006.01) |
| G06K 9/46 | (2006.01) |
| H04B 1/66 | (2006.01) |
| H04N 7/12 | (2006.01) |
| H04N 11/02 | (2006.01) |

(52) U.S. Cl. ............... 382/232; 375/240; 348/384.1

(58) Field of Classification Search ......... 382/232–253, 382/256–257; 375/240–240.29; 348/384.1–440.1
See application file for complete search history.

(56) References Cited

U.S. PATENT DOCUMENTS 4,890,249 A * 12/1989 Yen ............................. 703/13

(Continued)

FOREIGN PATENT DOCUMENTS

WO    WO 02/078352 A1    10/2002

OTHER PUBLICATIONS

Cheng, H.; Xiaobo Li, "Partial encryption of compressed images and videos," Signal Processing, IEEE Transactions on [see also Acoustics, Speech, and Signal Processing, IEEE Transactions on], vol. 48, No. 8, pp. 2439-2451, Aug. 2000.*

(Continued)

*Primary Examiner*—Bhavesh Mehta
*Assistant Examiner*—Manav Seth
(74) *Attorney, Agent, or Firm*—The Maxham Firm

(57) ABSTRACT

A method for coding and decoding digital data stored or transmitted according to the pixels method for transmitting prioritized pixels. The content of the information to the coded or decoded consists of individual pixel groups. Each pixel group comprises a place value, at least one pixel value and a priority value assigned thereto. At least one key which makes possible to code or decode the place value and/or the pixel value or values of the pixel group is used. The most varied needs can be taken into consideration during the coding in terms of used keys and coded parts of information, for example the place values and/or the pixel group values.

23 Claims, 3 Drawing Sheets

U.S. PATENT DOCUMENTS

| | | | | |
|---|---|---|---|---|
| 5,647,024 | A | * | 7/1997 | Kawauchi et al. ........... 382/232 |
| 5,757,382 | A | * | 5/1998 | Lee ............................ 345/441 |
| 5,787,199 | A | * | 7/1998 | Lee ............................ 382/203 |
| 6,647,143 | B1 | * | 11/2003 | Nakashima ................. 382/166 |
| 6,731,792 | B1 | * | 5/2004 | Tanaka ....................... 382/164 |
| 6,897,977 | B1 | * | 5/2005 | Bright ....................... 358/1.18 |
| 6,901,169 | B2 | * | 5/2005 | Bottou et al. ............... 382/224 |
| 6,983,049 | B2 | * | 1/2006 | Wee et al. ................... 380/200 |
| 7,359,560 | B2 | * | 4/2008 | Mossakowski ............. 382/240 |
| 2002/0124177 | A1 | * | 9/2002 | Harper et al. ............... 713/189 |
| 2004/0036635 | A1 | * | 2/2004 | Kimura et al. .............. 341/107 |

OTHER PUBLICATIONS

H. Cheng et al., "Partial Encryption of Compressed Images and Videos," IEEE Transactions on Signal Processing, vol. 48, No. 8, Aug. 2000, (pp. 2439-2451).

L. Teixeira et al., "Secure Transmission of MPEG Video Sources," ISPACS' 98-6th International Workshop on Intelligent Signal Processing and Communication Systems, Online, Nov. 6, 1998, (pp. 1-5).

J.C. Yen et al., "Efficient Hierarchical Chaotic Image Encryption Algorithm and Its VLSI Realisation," IEE Proceedings: Vision, Image and Signal Processing, vol. 147, No. 2, Apr. 20, 2000, (pp. 167-175).

* cited by examiner

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 20 | 21 | 22 | 23 | 24 | 25 | 26 | 27 | 28 | 29 | 30 | 31 | 32 | 33 | 34 | 35 | 36 | 37 | 38 | 39 |
| 40 | 41 | 42 | 43 | 44 | 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 | 96 | 97 | 98 | 99 |
| 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 | 195 | 196 | 197 | 198 | 199 |
| 200 | 201 | 202 | 203 | 204 | 205 | 206 | 207 | 208 | 209 | 210 | 211 | 212 | 213 | 214 | 215 | 216 | 217 | 218 | 219 |
| 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 | 256 | 257 | 258 | 259 |
| 260 | 261 | 262 | 263 | 264 | 265 | 266 | 267 | 268 | 269 | 270 | 271 | 272 | 273 | 274 | 275 | 276 | 277 | 278 | 279 |
| 280 | 281 | 282 | 283 | 284 | 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 | 375 | 376 | 377 | 378 | 379 |
| 380 | 381 | 382 | 383 | 384 | 385 | 386 | 387 | 388 | 389 | 390 | 391 | 392 | 393 | 394 | 395 | 396 | 397 | 398 | 399 |
| 400 | 401 | 402 | 403 | 404 | 405 | 406 | 407 | 408 | 409 | 410 | 411 | 412 | 413 | 414 | 415 | 416 | 417 | 418 | 419 |

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 20 | 21 | 22 | 23 | 24 | 25 | 26 | 27 | 28 | 29 | 30 | 31 | 32 | 33 | 34 | 35 | 36 | 37 | 38 | 39 |
| 40 | 41 | 42 | 43 | 44 | 45 | 46 | 47 | 48 | 49 | 50 | 51 | 52 | 53 | 54 | 55 | 56 | 57 | 58 | 59 |
| 60 | 61 | 62 | 63 | 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 | 96 | 97 | 98 | 99 |
| 100 | 101 | 102 | 103 | 104 | 105 | 106 | 107 | 108 | 109 | 110 | 111 | 112 | 113 | 114 | 115 | 116 | 117 | 118 | 119 |
| 120 | 121 | 122 | 123 | 124 | 125 | 126 | 127 | 128 | 129 | 130 | 131 | 132 | 133 | 134 | 135 | 136 | 137 | 138 | 139 |
| 140 | 141 | 142 | 143 | 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 | 176 | 177 | 178 | 179 |
| 180 | 181 | 182 | 183 | 184 | 185 | 186 | 187 | 188 | 189 | 190 | 191 | 192 | 193 | 194 | 195 | 196 | 197 | 198 | 199 |
| 200 | 201 | 202 | 203 | 204 | 205 | 206 | 207 | 208 | 209 | 210 | 211 | 212 | 213 | 214 | 215 | 216 | 217 | 218 | 219 |
| 220 | 221 | 222 | 223 | 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 |  | 248 | 249 | 250 | 251 | 252 | 253 | 254 | 255 | 256 | 257 | 258 | 259 |
| 260 | 261 | 262 | 263 | 264 | 265 | 266 | 267 | 268 | 269 | 270 | 271 | 272 | 273 | 274 | 275 | 276 | 277 | 278 | 279 |
| 280 | 281 | 282 | 283 | 284 | 285 | 286 | 287 | 288 | 289 | 290 | 291 | 292 | 293 | 294 | 295 | 296 | 297 | 298 | 299 |
| 300 | 301 | 302 | 303 | 304 | 305 | 306 | 307 | 308 | 309 | 310 | 311 | 312 | 313 | 314 | 315 | 316 | 317 | 318 | 319 |
| 320 | 321 | 322 | 323 | 324 | 325 | 326 | 327 | 328 | 329 | 330 | 331 | 332 | 333 | 334 | 335 | 336 | 337 | 338 | 339 |
| 340 | 341 | 342 | 343 | 344 | 345 | 346 | 347 | 348 | 349 | 350 | 351 | 352 | 353 | 354 | 355 | 356 | 357 | 358 | 359 |
| 360 | 361 | 362 | 363 | 364 | 365 | 366 | 367 | 368 | 369 | 370 | 371 | 372 | 373 | 374 | 375 | 376 | 377 | 378 | 379 |
| 380 | 381 | 382 | 383 | 384 | 385 | 386 | 387 | 388 | 389 | 390 | 391 | 392 | 393 | 394 | 395 | 396 | 397 | 398 | 399 |
| 400 | 401 | 402 | 403 | 404 | 405 | 406 | 407 | 408 | 409 | 410 | 411 | 412 | 413 | 414 | 415 | 416 | 417 | 418 | 419 |

Fig. 5

METHOD FOR CODING AND DECODING DIGITAL DATA STORED OR TRANSMITTED ACCORDING TO THE PIXELS METHOD FOR TRANSMITTING PRIORITISED PIXELS

BACKGROUND OF THE INVENTION

1. Field of the Invention

The present invention relates to a method to code and decode digital data transmitted or stored via the prioritized pixel transmission method.

2. Discussion of Related Art

The creation of informational content, such as pictures, videos, audio data and documents, is very complex. In the transmission and storage of such informational content, in many applications it is sensible and necessary to code the information in order to protect it against unauthorized access. To this end, there are a series of coding methods and applications that meet this need.

In these methods, coding of information can be done at various levels.

Directly in an application, for example using code word protection in personal computers or for access to a program Independent of an application, for example by means of the well-known PGP encoding method in the case of E-mail applications During the transmission of the information, for example the transmission of information over the Internet, using IPSec (Internet Protocol Security).

Prior art coding methods do not have the ability to code the information flexibly and scalably. This means that there isn't any way to flexibly adjust coding processes according to the information content and the specific applications. Such flexibility can, however be sensible if it is desired to offer video on demand, for example, wherein different fees are to be assessed for different video qualities, for example in as a function of the screen resolution.

SUMMARY OF THE INVENTION

One object of the invention is to provide a method for coding and decoding of digital data transmitted or stored according to the prioritized pixel transmission method, thereby making it possible to code the information flexibly and scalably.

The bases for the process according to the invention include the methods of compression and decompression of picture and video data using prioritized pixel transmission as described in U.S. Pat. No. 7,130,347 (corresponding to PCT/DE02/00987) and United States Patent Application Publication No. US 2004/0109609 A1 (corresponding to PCT/DE02/00995). In these methods, the digital data processed, for example image or video data, consist of an array of individual image points (pixels), wherein each pixel contains a pixel value, which can change over time, that provides information on the color or brightness of the pixel. According to the invention, each pixel or pixel group is assigned a priority, and the pixels are filed in a priority array according to their prioritization. At any given time, this array contains the pixel values sorted according to this prioritization. These pixels and the pixel values used for the calculation of their prioritization are transmitted or stored according to the prioritization. A pixel receives a high priority if the difference from its adjacent pixel is very large. During reconstruction, the current pixel values are shown on the display. The pixels that have still not been transmitted are calculated from the pixels already transmitted.

The disclosures of U.S. Pat. No. 7,130,347 and United States Patent Application Publication No. US 2004/0109609 A1 are incorporated by reference in their entireties in the disclosure of this invention.

According to this invention, the transmission and storage of the prioritized pixel groups is done in the form of data packets, wherein the data packets can contain not just image data in the form of image points (pixels), but can contain any type of digital data that can be stored in an array. The data packet consists of a data value that described the position of the pixel group in the array and also contains the values of the individual pixels of the pixel group. By coding the positional value of the pixel group and/or the pixel values of the pixel group, it becomes possible to protect the data contents against unauthorized access. Depending on the keys used and on which portions of the information content are coded, for example positional values and/or pixel group values, a wide variety of coding needs can be met. The data packets are transmitted and/or stored in descending order according to importance. Thus, according to the invention it is possible to code and decode the pixel groups according to their importance, at least for static, temporally unchanging n-dimensional arrays.

The advantage of the invention compared to the current state of the art is in the scalable manipulation of the coding method. In contrast to usual methods, separately coding the positional values and/or pixel group values offers the advantage that this becomes the only method necessary to incorporate into the respective applications and devices when different requirements arise. Once this method is implemented, a wide variety of requirements can utilize the same method. This educes the number of implementations, which among other things saves memory space, which is of limited availability, particularly for mobile end users. The reduction of the number of implementations is due to the ability to code audio, image and video data with the same method.

BRIEF DESCRIPTION OF THE DRAWING

The objects, features and advantages of the invention will be more clearly perceived from the following detailed description, when read in conjunction with the accompanying drawing, wherein:

Figures 3, 4:
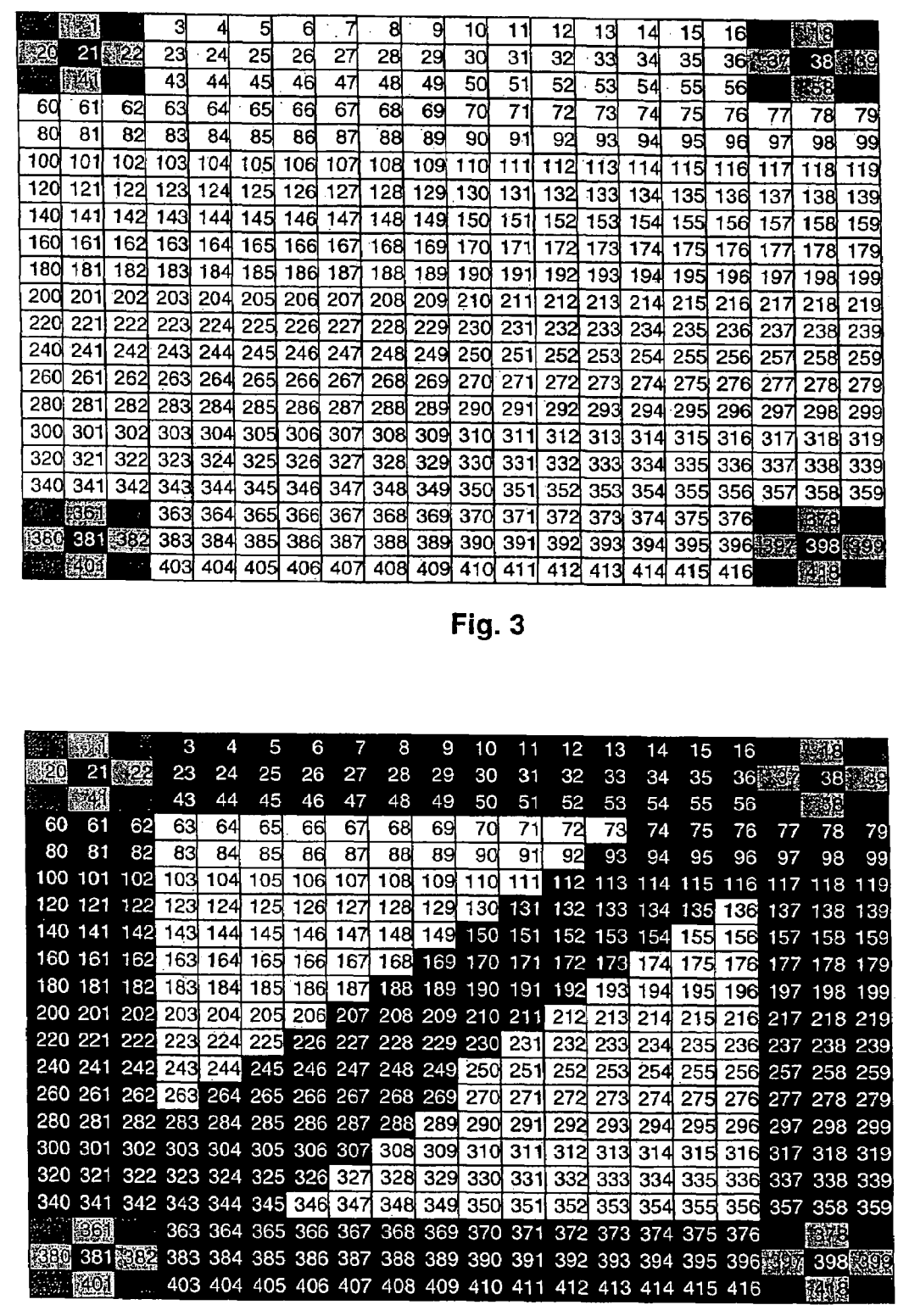

FIG. 3 is a newly generated image array with pixel groups inserted in the corners of the image;

FIG. 4 is a representation showing filling in the surfaces between the pixel groups already inserted; and FIG. 5 is a representation showing inserting more pixel groups and filling in the intermediate surfaces.

DETAILED DESCRIPTION OF THE PREFERRED EMBODIMENTS

Figures 1, 2:
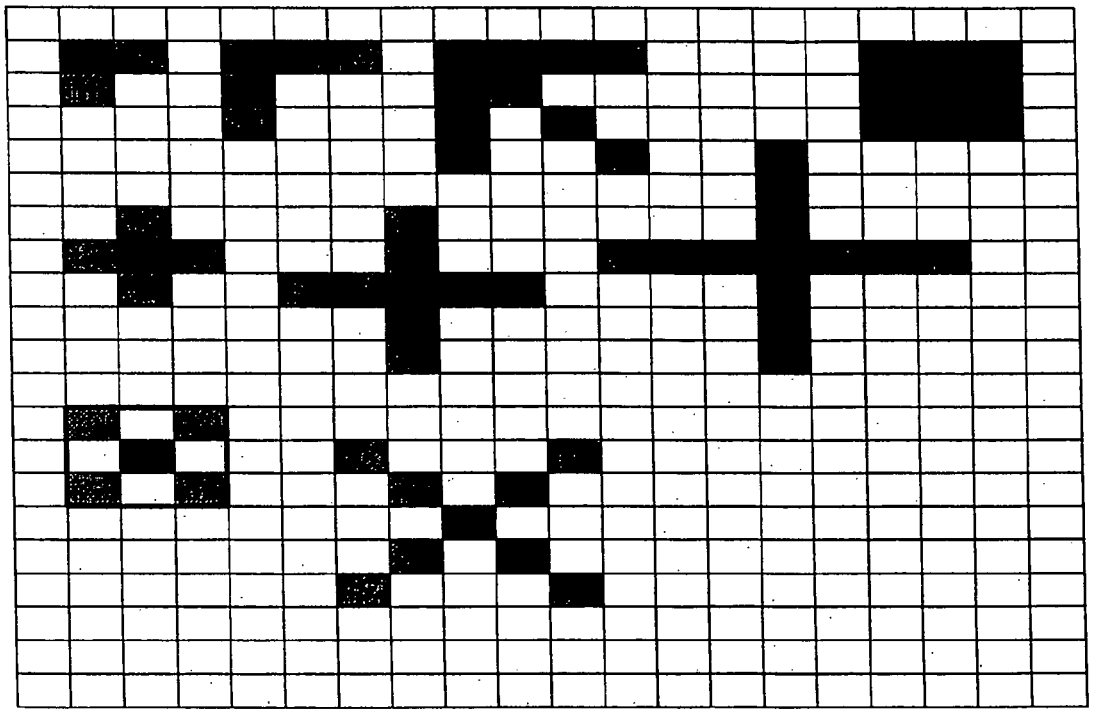
FIG. 1 is a representation of an image array made up of 20×21 pixels.
FIG. 2 is a representation of various forms of pixel groups.

A few exemplary embodiments of the invention are explained below.

It is assumed that the information content exists as a 2-dimensional image file (image array). Each image point (pixel) of the image array is represented by a 32 Bit value (pixel value), for example. The 32 Bits are divided into 4 values (transparent, red, green, blue), each with 8 Bits. The image points of the image array are enumerated, with the position of each pixel being given a whole number value. Pixel groups are formed consisting of a reference pixel that indicates the position of the pixel group within the array, and other pixels that surround the reference pixel. Each pixel group is assigned a priority depending on its "image importance", with the pixel groups with the highest priority being stored or transmitted first.

The pixel groups can now be transmitted or stored at different coding levels according to the invention.

No Coding:

Free access to all information content, i.e. the pixel groups are transmitted in un-coded form.

Use of a Simple Key:

A single key is used to code and decode, i.e. a symmetric coding process is used. In this method for example, the positional values of the reference pixels of a pixel group can be coded so that without the right key, it is impossible to place the pixel groups in the right position in the image array. The key can be transmitted via a second transmission path, for example via Email or regular mail. No other infrastructure is necessary. A symmetric coding method is faster than an asymmetric method such as PGP.

Use of an asymmetric coding method. A private and public key are used to code and decode the information content, respectively. The coding is complex compared to symmetric methods, and is limited to only point-to-point relationships. However, it is not necessary to transmit the key via a second transmission path.

Use of a Multiple Key:

A multiple is made up of a combination of individual keys. The keys can be dependent on information content, on time, original source, on transmission medium or on other features.

This allows the playback of information content to be limited arbitrarily as needed, allowing the information to be displayed according to the situation. Here are a few examples:

Temporal components in the key: The information content can only be decoded beginning at/by a specific time point.

Key is dependent on the transmission medium: The information content can only be decoded if the transmission medium has a specific identification.

Key dependent on the original source: The information content can only be decoded at, for example, the device that recorded it in order to provide protection against misuse when creating backup copies.

Use of Cascaded Keys:

Cascaded keys can be used to partially encode the information content. For example, this method can be applied to transmit a normal quality in coded form and a poor quality, for example for a pictorial preview, in un-coded form in the same data stream without any consequent redundancy. Such redundancy can, for example, reduce the resolution of a picture. In this context, "resolution" does not mean "picture height× picture width", since this parameter doesn't change when using this method. Rather, a reduction in resolution indicates a deviation in the original image, which can occur during reconstruction because of pixel groups that have not yet been transmitted and/or decoded. The method of cascaded keys works according to the principle of the onion layer. For example, in using the method of prioritized pixel transmission, the pixel group size can be reduced to create a cascaded keying sequence. A pixel group consists of a (reference) pixel that is clearly specified by its positional value, and a number of other pixels. For example, if a pixel group consists of a total of 9 pixels, 5 pixels can be transmitted in un-coded form and 4 pixels can be transmitted in coded for. The outer layer that includes the 5 un-coded pixels contains no coding and would permit the viewing of a video at postage stamp size without a key, for example. At the next layer, one or more of the coded pixels are transmitted. For each further layer, another key is used. The type of layer is agreed upon between sender and receiver prior to the transmission. In this way, whoever has all the keys and can decode all the layers can view the video in the best quality.

In order to reduce disruptions that can arise as a result of, for example, dependencies between the data of the individual layers, a hash value can be transmitted along with the positional value and the values of the pixel groups in this type of coding. This hash value is calculated from the positional value and the values of the pixel groups. If the hash value calculated in the receiver does not agree with the transmitted hash value, these pixel groups are not decoded. This prevents any disruptions from other layers from occurring.

It is possible to combine the different keys and methods.

Of course, the coding method according to the invention is not just applicable to image and video data, but also to all types of digital data that can be subdivided into data blocks, similar to the data blocks of image points.

This invention is explained in more detail below with the help of a simple example.

In Table 1, a portion of a data stream is shown that was prepared according to the prioritized pixel transmission method. The value "Pos x" indicates the respective position of the pixel group, "Px_n" indicates the individual pixel values of the pixels contained in the pixel group. For example, each pixel group consists of 5 pixels.

TABLE 1

| Pos0 | P0_0 | P0_1 | P0_2 | P0_3 | P0_4 | P0_5 | Pos1 | P1_0 | P1_1 | P1_2 | P1_3 | P1_4 | P1_5 |
| --- | --- | --- | --- | --- | --- | --- | --- | --- | --- | --- | --- | --- | --- |

Table 2 indicates the coding of just the positional values. Advantage: only a portion of the data stream needs to be coded, which provides a clear increase in performance compared to a complete coding of all data. A reconstruction of the data so coded without knowledge of the key is not possible, or it is only possible with a lot of computing power.

TABLE 2

| Pos0 | P0_0 | P0_1 | P0_2 | P0_3 | P0_4 | P0_5 | Pos1 | P1_0 | P1_1 | P1_2 | P1_3 | P1_4 | P1_5 |
| --- | --- | --- | --- | --- | --- | --- | --- | --- | --- | --- | --- | --- | --- |

Table 3 indicates the coding of part of the pixel groups. Advantage: The same pixel group provides different qualities of image, audio or video data reconstruction due to differences in coding of the pixel values. In the example illustrated below, the receiver can use the positional value and the pixel values Px_0 through Px_2 without a key. To decode the pixel values Px_3 through Px_5, the correct keys are needed respectively. If the receiver does not have the key(s) for the pixel values Px_3 through Px_5, the application must reconstruct these pixel values from the available values Px_0 through Px_2. However, since the receiver is missing a number of pixel values, the quality of the reconstruction (resolution) is considerably reduced.

TABLE 3

| Pos0 | P0_0 | P0_1 | P0_2 | P0_3 | P0_4 | P0_5 | Pos1 | P1_0 | P1_1 | P1_2 | P1_3 | P1_4 | P1_5 |
|------|------|------|------|------|------|------|------|------|------|------|------|------|------|

In the examples illustrated, coded and un-coded data are transmitted in the same data stream. In order to recognize transmission errors and to recognize whether the decoding was successful, each portion of the pixel group (position value and Px_n) can receive a CRC check in decoded form. If a transmission error occurs, and the CRC check fails, the corresponding pixel value is not used in the reconstruction. The other portion of the pixel group can continue to be used. In this way, the robustness of the transmission process against transmission errors increases at the same time. Instead of a CRC check, hash functions can be used. These offer better backup protection, but require more computing power.

The invention has been illustrated and described by means of specific embodiments. It is to be understood that numerous changes and modifications maybe made therein without departing from the scope of the invention as defined in the appended claims.

What is claimed is:

1. A method to code and decode digital data that is prioritized for transmission or storage, wherein the digital data contains image data including an array of individual image points (pixels) where each pixel has pixel value which describes the color or luminance information of the pixel, wherein the pixels are prioritized by the steps of: a) determining a priority value for each pixel of the array by calculating a pixel difference value with the aid of the respective pixel value of the pixel in relation to the pixel values of a previously determined group of neighboring pixels; b) combining the pixels used for the calculation of priority value into a pixel group; and c) sorting the pixel groups of the image array with the aid of their priority value, wherein the information to be coded or decoded comprises individual pixel groups, wherein each pixel group has a positional value, at least one pixel value, and a priority value assigned to it, said method comprising using at least one key to selectively code or decode the positional value and/or the pixel value/pixel values of an individual pixel group.

2. The method according to claim 1, wherein the key is selectively linked to the type of information content to be coded and/or to the original source, and/or to the transmission medium used, or it contains a temporal relationship.

3. The method according to claim 1, wherein each pixel value, or one or more selected pixel values, are coded or decoded using its own separate key.

4. The method according to claim 2, wherein each pixel value, or one or more selected pixel values, are coded or decoded using its own separate key.

5. The method according to claim 1, wherein a symmetrical coding method is carried out.

6. The method according to claim 2, wherein a symmetrical coding method is carried out.

7. The method according to claim 4, wherein a symmetrical coding method is carried out.

8. The method according to claim 1, wherein an asymmetrical coding method is carried out.

9. The method according to claim 2, wherein an asymmetrical coding method is carried out.

10. The method according to claim 4, wherein an asymmetrical coding method is carried out.

11. The method according to claim 1, wherein in that the pixel groups are comprised of digitized scanned values of an audio signal.

12. The method according to claim 2, wherein in that the pixel groups are comprised of digitized scanned values of an audio signal.

13. The method according to claim 4, wherein in that the pixel groups are comprised of digitized scanned values of an audio signal.

14. The method according to claim 1, wherein the digital data contain image data, video data or audio data.

15. The method according to claim 4, wherein the digital data contain image data, video data or audio data.

16. The method according to claim 7, wherein the digital data contain image data, video data or audio data.

17. The method according to claim 13, wherein the digital data contain image data, video data or audio data.

18. The method according to claim 1, wherein the color level of the pixel values is coded or decoded in gradations using a separate key.

19. The method according to claim 7, wherein the color level of the pixel values is coded or decoded in gradations using a separate key.

20. The method according to claim 13, wherein the color level of the pixel values is coded or decoded in gradations using a separate key.

21. The method according to claim 14, wherein the color level of the pixel values is coded or decoded in gradations using a separate key.

22. The method according to claim 1, in combination with storing and/or transmitting the pixel groups according to their priority.

23. The method according to claim 22, wherein the transmission and storage of the prioritized pixel groups is done in the form of data packets, wherein an individual data packet contains a data value that describes the position of the pixel group in the array and further contains the values of the individual pixels of the pixel group, and wherein the data packets are transmitted and/or stored in descending order according to importance.

* * * * *